April 13, 1954 E. W. KAISER 2,674,947
FUEL SUPPLY SYSTEM
Filed April 24, 1951 2 Sheets-Sheet 2
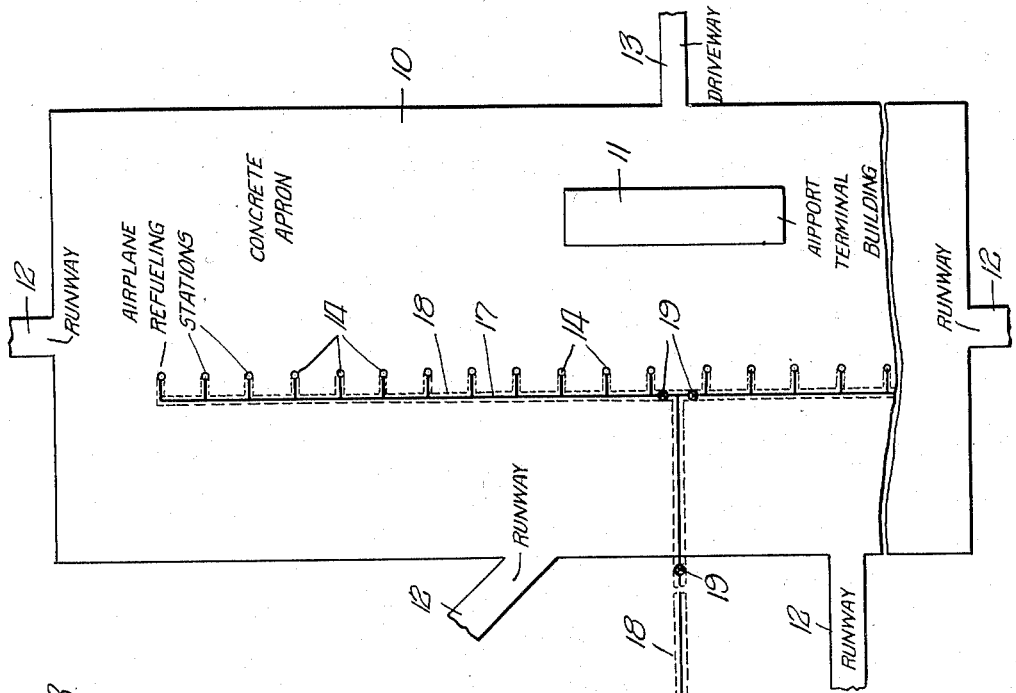
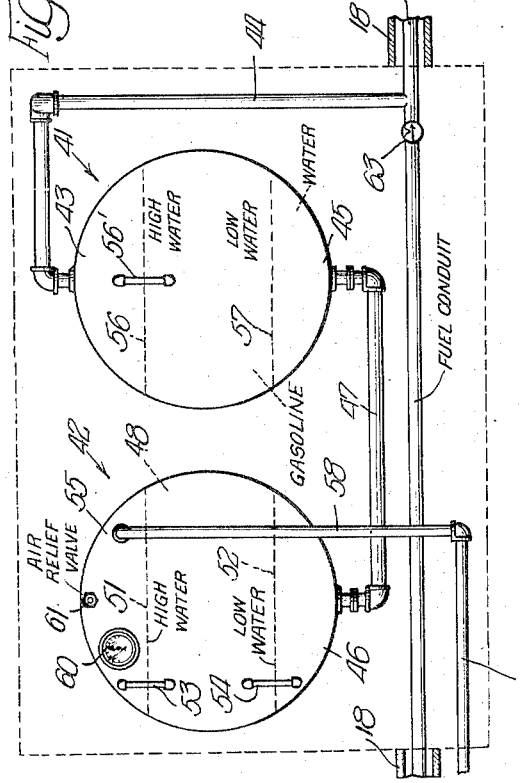
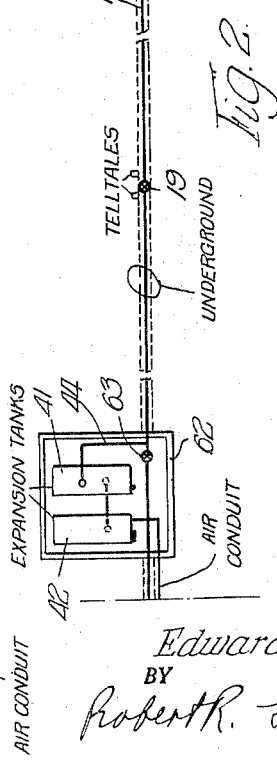
INVENTOR.
Edward W. Kaiser,
BY
Robert R. Lockwood
atty Patented Apr. 13, 1954

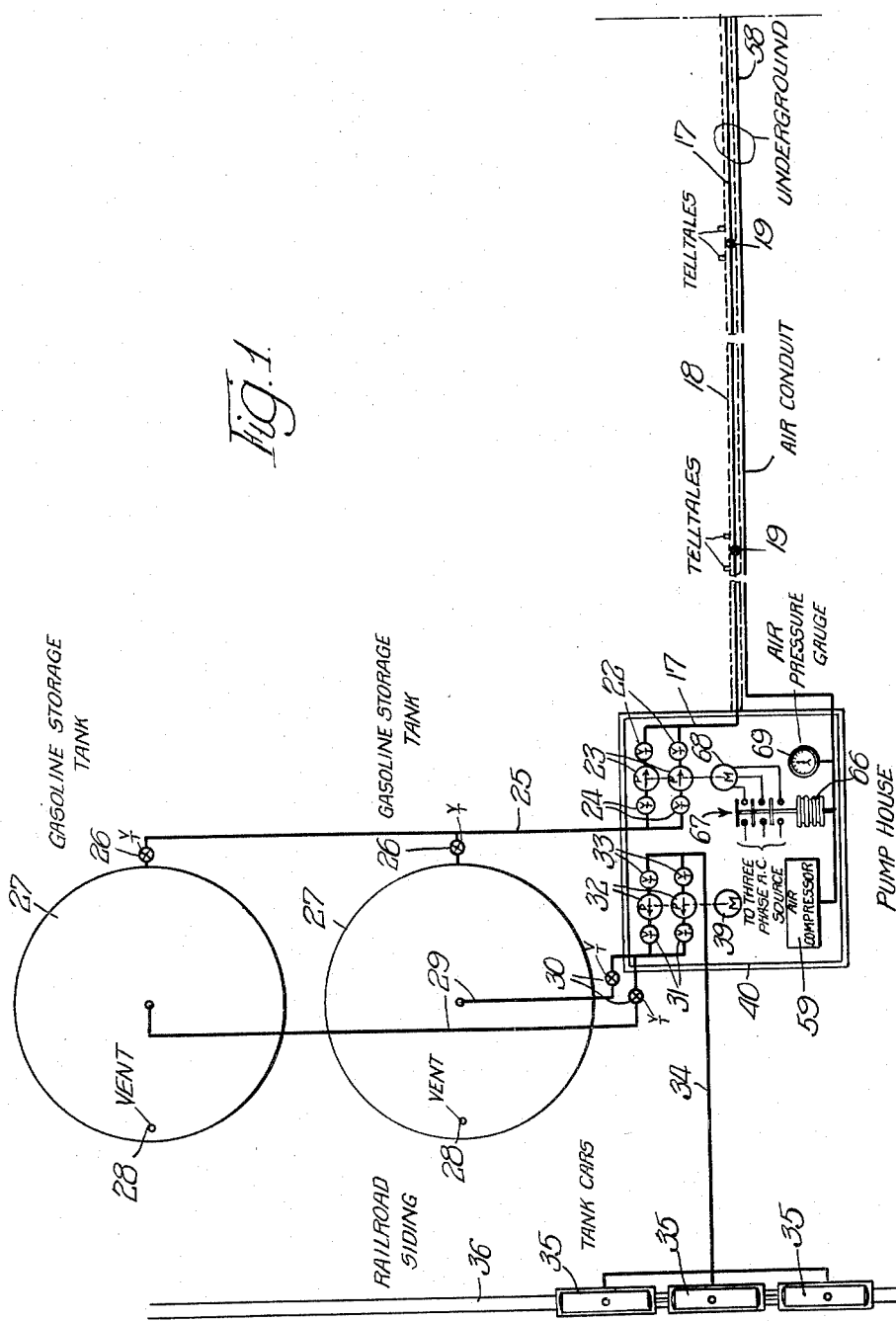

2,674,947

UNITED STATES PATENT OFFICE 2,674,947

FUEL SUPPLY SYSTEM

Edward W. Kaiser, Chicago, Ill.

Application April 24, 1951, Serial No. 222,703

8 Claims. (Cl. 103—1)

This invention relates generally to fuel supply systems and it has particular relation to systems for supplying fuel, such as gasoline, to airplanes for re-fueling them.

The fueling operations in and around air ports comprise the most hazardous phase of aircraft ground maintenance. Personnel injuries and property damage resulting directly from this work have for many years presented a serious problem. Various solutions have been offered to increase the safety factor and at the same time reduce the economic liability resulting from such losses. The fundamental hazard of fire in handling highly combustible fuel, such as gasoline, has been reduced through use of various safety mechanisms for that phase of the operation pertaining to transferring this fuel into the aircraft.

Under present methods the fuels are transported from central storage tanks by truck to the aircraft loading and parking aprons where they are transferred from the trucks to the aircraft fuel tanks. Many of the hazards originally encountered in transfer of fuel from the transport vehicle to the aircraft, during what may be termed loading phase, have been minimized. The use of fuel transport vehicles remains as the most objectionable part in this operation. All vehicles operating in proximity to moving or stationary aircraft create the imminent danger of collision. When these vehicles carry inherently dangerous cargo, such as combustible fuels, accidents of this nature produce serious consequences.

Dependence upon this form of transport has produced additional problems such as time delay while opertaing in adverse weather conditions. Central storage tanks must be removed to remote locations on the air port because of safety factors, yet great distances from the transfer or loading stations seriously impede the time consumed by these operations. Safety and time constitute the two ultimate factors which must be satisfied in the solution of these problems relating to fueling and re-fueling of airplanes.

Among the objects of this invention are: To supply fuel under pressure from a remote point to one or more re-fueling stations at an air port or the like in a simple, safe and efficient manner; to maintain sufficient pressure at the supply station to cause the fuel to flow without requiring additional pressure to be created immediately at the remote point; to accomplish this by employing a hydraulic piston mechanism actuated by gas, such as air, under pressure; to employ a liquid, such as water, between the air and the fuel to apply pressure from the former onto the latter; to connect a pair of expansion tanks together at their lower portions and one of them at its upper portion to a fuel conduit with water in both and air pressure thereabove in the other; and to employ the reduction in air pressure to start pump means at the remote point.

Other objects of this invention will, in part, be obvious and appear hereinafter.

This invention is disclosed in the embodiment thereof shown in the accompanying drawings and it comprises the features of construction, combination of elements and arrangement of parts which will be exemplified in the construction hereinafter set forth and the scope of the application of which will be indicated in the appended claims.

For a more complete understanding of the nature and scope of this invention, reference can be had to the following detailed description taken together with the accompanying drawings in which:

Figures 1 and 2 taken together show somewhat diagramatically a fuel supply system for an air port that is constructed in accordance with this invention; and Figure 3 is an enlarged view in end elevation of the expansion tanks and connections thereto shown in Figure 2.

Referring now particularly to Figure 2 of the drawings, it will be observed that the reference character 10 designates, generally, a concrete loading apron and the administration area of an air port with the air port terminal building designated by reference character 11, the taxi strips leading to the runways designated at 12 and a driveway 13 leading to the terminal building.

The airplane re-fueling stations are designated by reference character 14 showing a line of stations which can be changed in prospective relation to the various loading areas on a given air port.

The fuel is transferred from the remotely located storage tanks to the re-fueling stations 14 through a fuel conduit or inner pipe 17 which is enclosed in an underground housing or outer pipe casing 18. Preferably the underground piping system including the fuel conduit or inner pipe 17 and the surrounding housing or outer pipe casing 18 is constructed as disclosed in copending application Serial No. 47,851, filed September 4, 1948. Throttle valves 19 are interspersed throughout the fuel conduit 17 for sectionalizing purposes. In Figure 1 additional throttle valves 22 and 24 are located adjacent fuel pumps 23 to provide a cut off for maintenance at this section. Fuel is supplied from main storage tanks 27 through a fuel supply conduit 25 to the pump 23. The storage tanks 27 preferably are located a mile or more away from the stations 14 and may each have a capacity of 500,000 gallons. Throttle valves 26 are located at the main storage tank outlets as selection means for fuel supply. Air vents 28 are affixed at the top portions of the storage tanks 27 in order that atmospheric pressure may be maintained upon diaphragm means therein.

Fuel conduits 29 provide means for transfer of fuel into the main storage tanks 27 and throttle valves 30 and 31 are inserted within them for shutting off fuel supply. Fuel pumps 32 provide pumping means for transfer of fuel from a primary source into main storage tanks 27 and throttle valves 33 are provided to permit shut-off and repair of the pumps 32. A fuel supply conduit 34 is so located for transfer of fuel from tank cars 35 standing on a railroad siding 36. Fuel pumps 32 facilitate transfer of fuel from the tank cars 35 to the main storage tanks 27 and are driven by a motor 39.

In order to provide protection in the working area for the pumps 23 and 32 and interconnected fuel lines together with the other appurtenances to this system, a pump house 40 is located adjacent or in proximity to the main storage tanks 27. The pump house 40 is preferably of a concrete construction.

With the system as heretofore described, when more than one fuel station 14 at the terminal end of said fuel system is in operation, pressure within the system is provided by one or both pumps 23. In order to maintain the required pressure at the fuel stations 14, when more than one of them is in operation, the fuel pumps 23 operate automatically in relation to the demand at these fuel stations 14. However, because of the remote location of the pumps 23, there is necessarily some time delay between the opening of the re-fueling stations 14 and the starting of the pumps 23 or the supplying of the fuel under the required pressure at the stations 14.

With a view to maintaining the pressure at the refueling stations 14, expansion tanks, designated by reference characters 41 and 42 and shown in Figures 2 and 3, are located in side by side relation at an intermediate position between the storage tanks 27 and the re-fueling stations 14. For example, the tanks 27 may be located half way between the stations 14 and the storage tanks 27. The expansion tank 41 may have a 20,000 gallon capacity while the expansion tank 42 has a slightly smaller capacity although it will be understood that they may be larger or smaller as desired. The fuel is pumped from the main storage tanks 27 through the fuel conduit 17 into the expansion tank 41 and occupies the upper portion thereof as shown at 43 in Figure 3. The fuel is forced into expansion tank 41 through branch conduit 44 from the fuel conduit 17 and is held in the upper portion 43 of the expansion tank 41 by a liquid, such as water, which is heavier than and immiscible with the fuel such as gasoline. This heavier liquid is held under pressure in the lower portion 45 of the expansion tank 41 and in the lower portion 46 of the expansion tank 42 and acts as a piston held in suspension between the fuel and a gas, such as compressed air, creating this pressure. The heavier immiscible liquid may pass through an interconnecting conduit 47 and thus acts as a hydraulic piston mechanism actuated by the gas under pressure in expansion tank 42. The variance in expansion tank 42 in position of the liquid or water exerting pressure upon the fuel is illustrated in Figure 3 by the broken line 51 showing the high water level and broken line 52 showing the low water level. A set of sight glasses 53 and 54 is provided for indication of these levels. In the upper portion of expansion tank 42, designated by reference character 55, gas under pressure acts against the upper surface of the water therein. The high water and low water levels indicated by broken lines 56 and 57 illustrate in expansion tank 41 the range of change in water level therein under conditions attendant to the system of operation. A sight glass 56' on the expansion tank 41 permits observation of the liquid level at 56.

The volume of the expansion tank 41 is selected so that it is greater than the volume of the liquid, such as water, which acts as a hydraulic piston to force the fuel to flow out of the tank 41. For this reason the level of the water in the tank 41 cannot rise to such a point that it would flow out of the tank 41 through the branch conduit 44.

Any suitable means can be employed for applying gas pressure to the upper portion 55 of the expansion tank 42. For example, a bottle of compressed gas, such as argon or helium, can be connected thereto to provide the required operating pressure. Preferably the operating pressure is applied through an air conduit 58 which parallels the fuel conduit 17 and, as shown in Figure 1, extends to the pump house 40 for control purposes. Pressure in the conduit 58 may be applied by an air compressor 59 or from a bottle of gas under pressure. The air pressure within the upper portion 55 of the expansion tank 42 can be indicated by a pressure gauge 60. If desired a pressure relief valve 61 can be provided, as shown.

As indicated, the expansion tanks 41 and 42 are located midway between the stations 14 and the storage tanks 27. If desired, they may be located otherwise, for example, relatively close to the stations 14. Preferably they are located in a cell 62 of concrete or the like and may be buried underground. A check valve 63 in the fuel conduit 17, Figure 3, permits flow of fuel from the pumps 23 but prevents reverse flow when the pressure from the air above the water in expansion tank 42 exceeds the pressure in the fuel conduit 17.

Pursuant to this invention the pumps 23 are controlled in accordance with the change in air pressure in the expansion tank 42 as it appears in the air conduit 58 in the pump house 40. For this purpose an air pressure responsive device 66, such as a "Sylphon" bellows, is connected thereto as shown in Figure 1 and is arranged to control a switch 67, preferably with a snap action. The switch 67, as shown, is arranged to connect a three phase motor 68, which drives the pumps 23, to a suitable source of polyphase alternating current. The air pressure within the air conduit in the pump house 40 can be indicated by a pressure gauge 69.

In describing the operation of the system shown in the drawings it will be assumed that all of the stations 14 are closed, the switch 67 is open, the pumps 23 are not operating and the gas pressure applied in the expansion tank 42 is of the order of about 75 pounds per square inch. Next it will be assumed that one or more of the stations 14 is opened with the result that fuel flows therefrom under the influence of the gas pressure in the expansion tank 42. This pressure forces the water from the tank 42 into the expansion tank 41 and the fuel thereabove out of the top through the branch conduit 44 and into the fuel conduit 17. The check valve 63 prevents any flow toward the pumps 23.

When the air expands to transfer the water from the tank 42 to the tank 41 for supplying the fuel through the open station or stations 14, its pressure is reduced, for example to 50 pounds pressure per square inch. As a result, the pressure responsive device 66 operates to effect closure of the switch 67 to energize the motor 68 and operate the pumps 23. They build up the pressure in the fuel conduit 17 and have sufficient capacity, not only to pump the fuel directly to the stations 14 that are open, but also to restore the gas pressure within the expansion tank 42 to the higher value such as 75 pounds per square inch. This is accomplished by causing some of the fuel to flow through the branch conduit 44 into the expansion tank 41. The water therein is returned through the conduit 47 to the expansion tank 42 where the gas thereabove is recompressed. When it reaches a predetermined value, for example 75 pounds per square inch, sufficient to operate the pressure responsive device 66, the switch 67 is opened and the motor 68 is deenergized. This cycle is repeated on subsequent operation of any of the stations 14.

If there are no leaks in the air conduit 58, it is unnecessary to employ the air compressor 59 or its equivalent connected as shown in the drawings. While the expansion tanks 41 and 42 have been shown as being located along side each other with their longitudinal axes horizontal, they may be otherwise located. If desired they can be located with their axes vertical or they can be located one above the other. Also, they can be confined in a single enclosure with a suitable partition therein.

As indicated, the expansion tank 42 has a volume slightly less than that of tank 41. Preferably the volume of the expansion tank 42 and the air conduit 58 together is less than the volume of the tank 41. The amount of liquid 48, such as water, is preferably equal to the combined volumes of the expansion tank 42 and of the air conduit 58 so that, if the gas or air pressure should be lost and pressure continue to be applied to the fuel in the tank 41, none of it could possibly be transferred to the tank 42.

Since certain changes can be made in the foregoing system and different embodiments of the invention can be made without departing from the spirit and scope thereof, it is intended that all matter shown in the accompanying drawings and described hereinbefore shall be interpreted as illustrative and not in a limiting sense.

What is claimed as new is:

1. A system for supplying fuel, such as gasoline, under pressure from one or more storage tanks to one or more remotely located re-fueling stations comprising, in combination, a fuel conduit for interconnecting said storage tanks and said re-fueling stations, pump means adjacent said tanks for pumping fuel therefrom through said conduit to said re-fueling stations under pressure, a pair of expansion tanks interconnected at their lower portions and located intermediate said pump means and said re-fueling stations with the upper portion of one of said expansion tanks connected to said fuel conduit, and a liquid which is heavier than and immiscible with said fuel in the other expansion tank with gas under pressure thereabove, said liquid also being in the lower portion of said one expansion tank and the volume thereof being greater than the volume of said liquid whereby, when said gas expands on lowering of the pressure in said conduit as a result of operation of one or more of said re-fueling stations and said liquid is forced into said one expansion tank, said liquid cannot escape therefrom, said expansion tanks having sufficient volume and there being sufficient gas under pressure on said liquid in said other expansion tank to cause the same to flow therefrom into said one expansion tank and the fuel therein to flow out of the upper portion thereof into said fuel conduit on the lowering of the pressure therein as a result of the operation of one or more of said re-fueling stations, the subsequent cessation of operation of said re-fueling stations with said pump means in operation resulting in the raising of the fuel pressure in said fuel conduit and returning said liquid to said other expansion tank thereby raising the gas pressure in the upper portion thereof to its initial value.

2. A system for supplying fuel, such as gasoline, under pressure from one or more storage tanks to one or more remotely located re-fueling stations comprising, in combination, a fuel conduit for interconnecting said storage tanks and said re-fueling stations, pump means adjacent said tanks for pumping fuel therefrom through said conduit to said re-fueling stations under pressure, a pair of expansion tanks interconnected at their lower portions and located intermediate said pump means and said re-fueling stations, a branch conduit interconnecting said fuel conduit and the upper portion of one of said expansion tanks, and a liquid which is heavier than and immiscible with said fuel in the other expansion tank with gas under pressure thereabove, said liquid also being in the lower portion of said one expansion tank and there being an insufficient amount thereof to fill said one expansion tank, said expansion tanks having sufficient volume and there being sufficient gas under pressure in the upper portion of said other expansion tank to cause said liquid to flow therefrom into said one expansion tank and the fuel therein to flow out of the upper portion thereof into said fuel conduit on the lowering of the pressure therein as a result of the operation of one or more of said re-fueling stations, the subsequent cessation of operation of said re-fueling stations with said pump means in operation resulting in the raising of the fuel pressure in said fuel conduit and returning said liquid to said other expansion tank thereby raising the gas pressure in the upper portion thereof to its initial value.

3. A system for supplying fuel, such as gasoline, under pressure from one or more storage tanks to one or more remotely located re-fueling stations comprising, in combination, a fuel conduit for interconnecting said storage tanks and said refueling stations, pump means adjacent said tanks for pumping fuel therefrom through said conduit to said re-fueling stations under pressure, a pair of expansion tanks intermediate said pump means and said re-fueling stations, conduit means interconnecting said fuel conduit and the upper portion of one of said expansion tanks, a check valve in said fuel conduit between said conduit means and said pump means to prevent reverse flow of the fuel therein, conduit means interconnecting the lower portions of said expansion tanks, a liquid which is heavier than and immiscible with said fuel in the other expansion tank leaving an air space thereabove, said liquid also being in the lower portion of said one expansion tank, and air under pressure in said air space, said expansion tanks having sufficient volume and there being sufficient air under pressure in the upper portion of said other expansion tank to cause said liquid to flow therefrom into said one expansion tank and the fuel therein to flow out of the upper portion thereof into said fuel conduit on the lowering of the pressure therein as a result of the operation of one or more of said re-fueling stations, the subsequent cessation of operation of said re-fueling stations with said pump means in operation resulting in the raising of the fuel pressure in said fuel conduit and returning said liquid to said other expansion tank thereby raising the air pressure in the upper portion thereof to its initial value.

4. A system for supplying fuel, such as gasoline, under pressure from one or more storage tanks to one or more remotely located re-fueling stations comprising, in combination, a fuel conduit for interconnecting said storage tanks and said re-fueling stations, pump means adjacent said tanks for pumping fuel therefrom through said conduit to said re-fueling stations under pressure, a motor for driving said pump means, switch means for connecting said motor for energization to a current source, a pair of expansion tanks interconnected at their lower portions and located intermediate said pump means and said re-fueling stations, a conduit means interconnecting said fuel conduit and the upper portion of one of said expansion tanks, a liquid which is heavier than and immiscible with said fuel in the other expansion tank, said liquid also being in the lower portion of said one expansion tank and there being an insufficient amount thereof to fill said one expansion tank, an air conduit connected between the upper portion of said other expansion tank and containing air under pressure of the order of that maintained in said fuel conduit by said pump means, and air pressure responsive means connected to said air conduit and operatively connected to said switch means, said expansion tanks having sufficient volume and there being sufficient air under pressure on said liquid in said other expansion tank to cause the same to flow therefrom into said one expansion tank and the fuel therein to flow out of the upper portion thereof into said fuel conduit on the operation of one or more of said re-fueling stations when said pump means is idle whereupon the air pressure applied to said air pressure responsive means is reduced and said switch means is closed to energize said motor and drive said pump means thereby raising the fuel pressure in said fuel conduit and returning said liquid to said other expansion tank resulting in raising the air pressure therein whereupon said air pressure responsive means is operated to open said switch means and said motor is deenergized.

5. A system for supplying fuel, such as gasoline, under pressure from one or more storage tanks to one or more remotely located re-fueling stations comprising, in combination, a fuel conduit for interconnecting said storage tanks and said re-fueling stations, pump means adjacent said tanks for pumping fuel therefrom through said conduit to said re-fueling stations under pressure, a motor for driving said pump means, switch means for connecting said motor for energization to a current source, a pair of expansion tanks interconnected at their lower portions and located intermediate said pump means and said re-fueling stations, conduit means interconnecting said fuel conduit and the upper portion of one of said expansion tanks, a liquid which is heavier than and immiscible with said fuel in the other expansion tank and in the lower portion of said one expansion tank, an air conduit connected to the upper portion of said other expansion tank and containing air under pressure of the order of that maintained in said fuel conduit by said pump means, and air pressure responsive means to said air conduit and operatively connected to said switch means, said expansion tanks having sufficient volume and there being sufficient air under pressure on said liquid in said other expansion tank to cause the same to flow therefrom into said one expansion tank and the fuel therein to flow out of the upper portion thereof into said fuel conduit on the operation of one or more of said re-fueling stations when said pump means is idle whereupon the air pressure applied to said air pressure responsive means is reduced and said switch means is closed to energize said motor and drive said pump means thereby raising the fuel pressure in said fuel conduit and returning said liquid to said other expansion tank resulting in raising the air pressure in the upper portion thereof whereupon said air pressure responsive means is operated to open said switch means and said motor is deenergized.

6. A system for supplying fuel, such as gasoline, under pressure from one or more storage tanks to one or more remotely located re-fueling stations comprising, in combination, a fuel conduit for interconnecting said storage tanks and said re-fueling stations, pump means adjacent said tanks for pumping fuel therefrom through said conduit to said re-fueling stations under pressure, a motor for driving said pump means, switch means for connecting said motor for energization to a current source, a pair of expansion tanks intermediate said pump means and said re-fueling stations, a branch conduit interconnecting said fuel conduit and the upper portion of one of said expansion tanks, a check valve in said fuel conduit between said branch conduit and said pump means to prevent reverse flow of the fuel therein, a conduit means interconnecting the lower portions of said expansion tanks, a liquid which is heavier than and immiscible with said fuel in the other expansion tank and in the lower portion of said one expansion tank, an air conduit connected between the upper portion of said other expansion tank and a source of air under pressure of the order of that maintained in said fuel conduit by said pump means, and air pressure responsive means connected to said air conduit and operatively connected to said switch means, said expansion tanks having sufficient volume and there being sufficient air under pressure in the upper portion of said other expansion tank to cause said liquid to flow therefrom into said one expansion tank and the fuel therein to flow out of the upper portion thereof into said fuel conduit on the operation of one or more of said re-fueling stations when said pump means is idle whereupon the air pressure applied to said air pressure responsive means is reduced and said switch means is closed to energize said motor and drive said pump means thereby raising the fuel pressure in said fuel conduit and returning said liquid to said other expansion tank resulting in raising the air pressure in the upper portion thereof whereupon said air pressure responsive means is operated to open said switch means and said motor is deenergized.

7. A system for supplying fuel, such as gasoline, under pressure from one or more storage tanks to one or more remotely located re-fueling stations comprising, in combination, a fuel conduit for interconnecting said storage tanks and said re-fueling stations, pump means adjacent said tanks for pumping fuel therefrom through said conduit to said re-fueling stations under pressure, a motor for driving said pump means, switch means for connecting said motor for energization to a current source, a pair of expansion tanks located intermediate said pump means and said re-fueling stations, a branch conduit interconnecting said fuel conduit and the upper portion of one of said expansion tanks, a conduit interconnecting the lower portions of said expansion tanks, a liquid which is heavier than and immiscible with said fuel in the other expansion tank and in the lower portion of said one expansion tank, an air conduit connected between the upper portion of said other expansion tank and a source of air under pressure of the order of that maintained in said fuel conduit by said pump means, and air pressure responsive means connected to said air conduit and operatively connected to said switch means, said expansion tanks having sufficient volume and there being sufficient air under pressure in the upper portion of said other expansion tank to cause said liquid to flow therefrom into said one expansion tank and the fuel therein to flow out of the upper portion thereof into said fuel conduit on the operation of one or more of said re-fueling stations when said pump means is idle whereupon the air pressure applied to said air pressure responsive means is reduced and said switch means is closed to energize said motor and drive said pump means thereby raising the fuel pressure in said fuel conduit and returning said liquid to said other expansion tank resulting in raising the air pressure in the upper portion thereof whereupon said air pressure responsive means is operated to open said switch means and said motor is deenergized.

8. A system for supplying fuel, such as gasoline under pressure from one or more storage tanks to one or more remotely located re-fueling stations comprising, in combination, a fuel conduit for interconnecting said storage tanks and said re-fueling stations, pump means adjacent said tanks for pumping fuel therefrom through said conduit to said re-fueling stations under pressure, a motor for driving said pump means, switch means for connecting said motor for energization to a current source, a pair of cylindrical expansion tanks located side by side with their longitudinal axes horizontal intermediate said pump means and said re-fueling stations, a branch conduit interconnecting said fuel conduit and the upper portion of one of said expansion tanks, a check valve in said fuel conduit between said branch conduit and said pump means to prevent reverse flow of the fuel therein, a conduit interconnecting the lower portions of said expansion tanks, a liquid which is heavier than and immiscible with said fuel in the other expansion tank and in the lower portion of said one expansion tank, an air conduit connected between the upper portion of said other expansion tank and a source of air under pressure of the order of that maintained in said fuel conduit by said pump means, the volume of said one expansion tank being at least equal to the volume of said other expansion tank and of said air conduit, and air pressure responsive means connected to said air conduit and operatively connected to said switch means, said expansion tanks having sufficient volume and there being sufficient air under pressure in the upper portion of said other expansion tank to cause said liquid to flow therefrom into said one expansion tank and the fuel therein to flow out of the upper portion thereof into said fuel conduit on the operation of one or more of said re-fueling stations when said pump means is idle whereupon the air pressure applied to said air pressure responsive means is reduced and said switch means is closed to energize said motor and drive said pump means thereby raising the fuel pressure in said fuel conduit and returning said liquid to said other expansion tank resulting in raising the air pressure in the upper portion thereof whereupon said air pressure responsive means is operated to open said switch means and said motor is deenergized.

References Cited in the file of this patent
UNITED STATES PATENTS

| Number | Name | Date |
|---|---|---|
| 749,994 | Johnson | Jan. 19, 1904 |
| 2,446,358 | Yates et al. | Aug. 3, 1948 |